(12) United States Patent
Sawyers-Abbott

(10) Patent No.: US 9,951,719 B2
(45) Date of Patent: Apr. 24, 2018

(54) COMBINED INLET LAMINAR AND THRUST REVERSER CASCADE EFFLUX FLOW CONTROL SYSTEM

(71) Applicant: United Technologies Corporation, Hartford, CT (US)

(72) Inventor: Nigel David Sawyers-Abbott, South Gastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 350 days.

(21) Appl. No.: 14/684,503

(22) Filed: Apr. 13, 2015

(65) Prior Publication Data

US 2016/0298574 A1 Oct. 13, 2016

(51) Int. Cl.
*F02K 1/54* (2006.01)
*B64C 21/04* (2006.01)
(Continued)

(52) U.S. Cl.
CPC .............. *F02K 1/54* (2013.01); *B64C 21/04* (2013.01); *B64C 21/06* (2013.01); *B64C 21/08* (2013.01);
(Continued)

(58) Field of Classification Search
CPC .... B64D 2033/0226; B64D 2033/0286; F02K 1/54; F02K 1/70; F02K 1/72; F02K 1/76; F15D 1/0065; F15D 1/008; F05D 2210/34; F05D 2270/17; B64C 21/08; B64C 21/025; B64C 21/06; B64C 21/04; F04C 18/00; F02C 7/04; F02C 7/057
See application file for complete search history.

(56) References Cited

U.S. PATENT DOCUMENTS 4,749,150 A 6/1988 Rose et al.
5,255,850 A 10/1993 Cockerham
(Continued)

FOREIGN PATENT DOCUMENTS

FR 2910937 7/2008
GB 811455 A 4/1959
(Continued)

OTHER PUBLICATIONS

European Search Report for European Application No. 16164848 completed Sep. 1, 2016.

*Primary Examiner* — Gerald L Sung
*Assistant Examiner* — Alain Chau
(74) *Attorney, Agent, or Firm* — Carlson, Gaskey & Olds, P.C.

(57) ABSTRACT

A nacelle assembly for a gas turbine engine according to an example of the present disclosure includes, among other things, a fan nacelle bounding a bypass flow path. The fan nacelle includes a first nacelle section and a second nacelle section. The second nacelle section includes a moveable portion movable relative to a forward portion to define a secondary flow passage. The first nacelle section includes an inlet lip. A thrust reverser is configured to selectively communicate a portion of bypass airflow between the bypass flow path and the secondary flow passage. A pump is configured to selectively communicate airflow between the inlet lip and the secondary flow passage. A method of flow distribution for a gas turbine engine is also disclosed.

21 Claims, 7 Drawing Sheets

(51) Int. Cl.
*B64C 21/06* (2006.01)
*B64D 33/02* (2006.01)
*F02K 1/76* (2006.01)
*F02K 1/72* (2006.01)
*B64C 21/08* (2006.01)
*B64D 27/10* (2006.01)
*B64D 29/00* (2006.01)
*F02C 3/04* (2006.01)
*F02K 3/06* (2006.01)

(52) U.S. Cl.
CPC ............. *B64D 27/10* (2013.01); *B64D 29/00* (2013.01); *F02C 3/04* (2013.01); *F02K 1/72* (2013.01); *F02K 1/76* (2013.01); *F02K 3/06* (2013.01); *B64D 2033/0226* (2013.01); *F05D 2210/34* (2013.01); *F05D 2270/17* (2013.01)

(56) References Cited

U.S. PATENT DOCUMENTS

| | | |
|---|---|---|
| 5,297,765 A | 3/1994 | Hughes et al. |
| 5,716,025 A | 2/1998 | Meyer |
| 5,743,493 A | 4/1998 | McCaughan |
| 6,151,883 A | 11/2000 | Hatrick et al. |
| 7,048,230 B2 | 5/2006 | Meyer |
| 7,766,280 B2 | 8/2010 | Cloft et al. |
| 8,209,953 B2 | 7/2012 | Winter et al. |
| 8,282,037 B2 * | 10/2012 | Jain ................ B64D 29/00 244/207 |
| 8,459,597 B2 | 6/2013 | Cloft et al. |
| 8,596,573 B2 | 12/2013 | Jain |
| 2014/0000279 A1 | 1/2014 | Brousseau et al. |
| 2015/0308377 A1* | 10/2015 | Packard ................ F02K 1/625 60/230 |

FOREIGN PATENT DOCUMENTS

| | | |
|---|---|---|
| GB | 2232132 A | 12/1990 |
| GB | 2285669 A | 7/1995 |
| GB | 2314818 | 1/1998 |

\* cited by examiner

SECTION A-A

COMBINED INLET LAMINAR AND THRUST REVERSER CASCADE EFFLUX FLOW CONTROL SYSTEM

BACKGROUND

The present disclosure relates to a propulsion system having integrated flow control assemblies for a nacelle inlet and thrust reverser.

Gas turbine engines can include a fan nacelle defining a bypass duct. An inlet lip of the fan nacelle guides incoming airflow to radially outer surfaces of the inlet lip and to a fan. The fan provides propulsion air through the bypass duct. The fan also delivers air into a core engine where it is compressed. The compressed air is then delivered into a combustion section, where it is mixed with fuel and ignited. The combustion gas expands downstream over and drives turbine blades.

Some gas turbine engines include a thrust reverser in which a translatable nacelle forms an outer wall portion of the bypass duct. The translatable nacelle is moved axially to communicate a portion of bypass airflow radially outward via a cascade to provide reverse thrust.

SUMMARY

A nacelle assembly for a gas turbine engine according to an example of the present disclosure includes a fan nacelle bounding a bypass flow path. The fan nacelle includes a first nacelle section and a second nacelle section. The second nacelle section includes a moveable portion movable relative to a forward portion to define a secondary flow passage. The first nacelle section includes an inlet lip. A thrust reverser is configured to selectively communicate a portion of bypass airflow between the bypass flow path and the secondary flow passage. A pump is configured to selectively communicate airflow between the inlet lip and the secondary flow passage.

In a further embodiment of any of the foregoing embodiments, the thrust reverser includes a cascade configured to direct bypass airflow through the secondary flow passage.

In a further embodiment of any of the foregoing embodiments, the forward portion defines a bull-nose having an arcuate profile configured to direct bypass airflow towards the cascade, and the bull-nose includes a perforated surface coupled to the pump.

In a further embodiment of any of the foregoing embodiments, the pump is configured to draw airflow from surfaces of the inlet lip.

In a further embodiment of any of the foregoing embodiments, the inlet lip includes a perforated surface coupled to the pump.

In a further embodiment of any of the foregoing embodiments, the perforated surface defines a radially outer wall of the inlet lip.

In a further embodiment of any of the foregoing embodiments, the pump is configured to selectively communicate airflow in at least a first flow direction and in a second flow direction in response to one or more operability conditions of the nacelle assembly.

In a further embodiment of any of the foregoing embodiments, the pump is configured to communicate airflow from the inlet lip to the second nacelle section.

In a further embodiment of any of the foregoing embodiments, airflow from the inlet lip is configured to discharge at a trailing edge region of the second nacelle section.

A further embodiment of any of the foregoing embodiments includes a controller configured to cause the pump to operate in at least a first mode and a second mode in response to determining one or more operability conditions of the nacelle assembly. Airflow is communicated from the forward portion to the inlet lip in the first mode, and airflow is communicated from the inlet lip to a location downstream of the inlet lip in the second mode.

A gas turbine engine according to an example of the present disclosure includes a core cowling arranged at least partially about a compressor section, a combustor section and a turbine section. A fan nacelle is arranged at least partially about the core cowling to define a bypass flow path. The fan nacelle includes a first nacelle section having an inlet lip and a second nacelle section. The second nacelle section includes a moveable portion movable relative to a forward portion to define a secondary flow passage. A thrust reverser is positioned axially between the first nacelle section and the second nacelle section. The thrust reverser includes a cascade configured to direct bypass airflow through the secondary flow passage. A bi-directional pump is configured to selectively communicate airflow between surfaces of the inlet lip and surfaces of the secondary flow passage.

In a further embodiment of any of the foregoing embodiments, the pump is configured to selectively communicate airflow in at least a first flow direction and in a second flow direction in response to one or more operability conditions of the engine.

In a further embodiment of any of the foregoing embodiments, airflow is discharged at radially outer surfaces of the inlet lip in response to the pump communicating airflow in the first flow direction, and airflow is drawn from surfaces of the inlet lip in response to the pump communicating airflow in the second flow direction.

In a further embodiment of any of the foregoing embodiments, the second nacelle section defines a cavity, and the bi-directional pump is configured to selectively discharge airflow to the cavity when the second nacelle section is located in a stowed position.

In a further embodiment of any of the foregoing embodiments, the pump is configured to communicate airflow from at least one of the inlet lip and the secondary flow passage to a heat exchanger.

A further embodiment of any of the foregoing embodiments includes a controller configured to cause the pump to operate in at least a first mode and a second mode in response to determining one or more operability conditions of the engine. Airflow is communicated in a first flow direction between the pump and surfaces of the inlet lip in the first mode, and is communicated in a second, different flow direction between the pump and surfaces of the inlet lip in the second mode. Airflow is communicated between the pump and surfaces of the secondary flow passage in the first mode, but not in the second mode.

A method of flow distribution for a gas turbine engine according to an example of the present disclosure includes providing a first nacelle having an inlet lip, providing a second nacelle including a forward portion and a moveable portion selectively defining a secondary flow passage, drawing airflow from surfaces of the inlet lip in response to detecting a first operating condition, and discharging airflow from the secondary flow passage to the surfaces of the inlet lip in response to detecting a second, different operating condition.

A further embodiment of any of the foregoing embodiments includes operating a flow device in a first flow direction in response to detecting the first operating condition, and operating the flow device in a second flow direction in response to detecting the second operating condition. The flow device is coupled to the inlet lip and the forward portion of the second nacelle.

In a further embodiment of any of the foregoing embodiments, the second nacelle defines a cavity, and airflow is selectively communicated from surfaces of the inlet lip to cavity.

In a further embodiment of any of the foregoing embodiments, the step of discharging airflow from the secondary flow passage to the surfaces of the inlet lip is in response to moving the moveable portion relative to the forward portion.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

DETAILED DESCRIPTION

Figure 1:
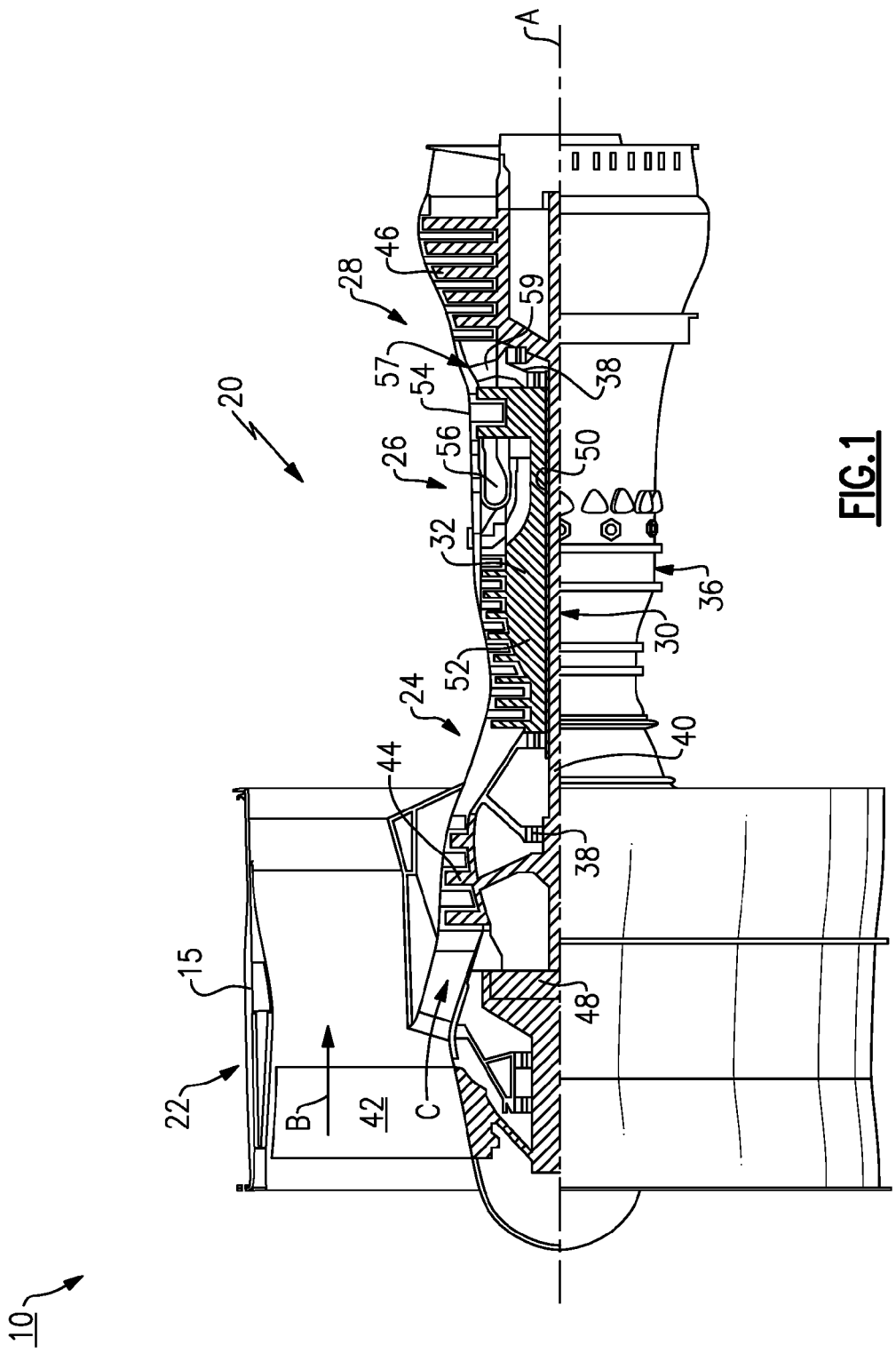
FIG. 1 schematically shows a gas turbine engine.
Figure 2A:
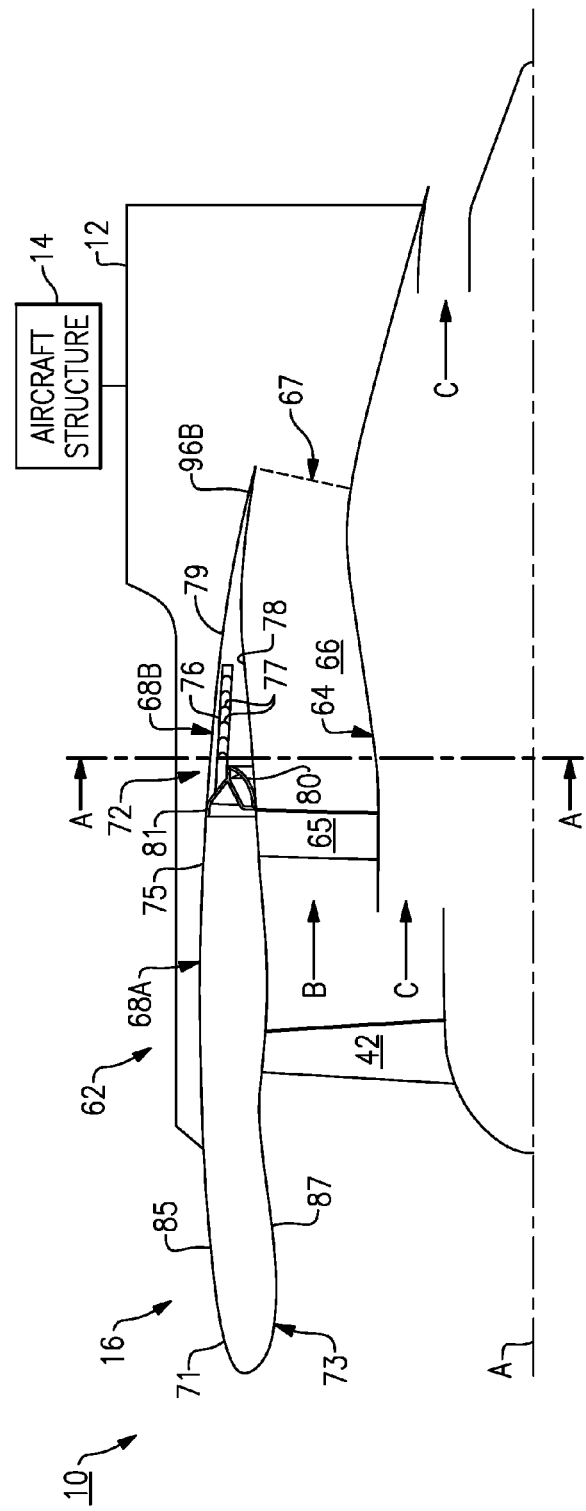
FIG. 2A is a schematic view of the engine and a nacelle assembly with a thrust reverser in a closed position.
Figure 2B:
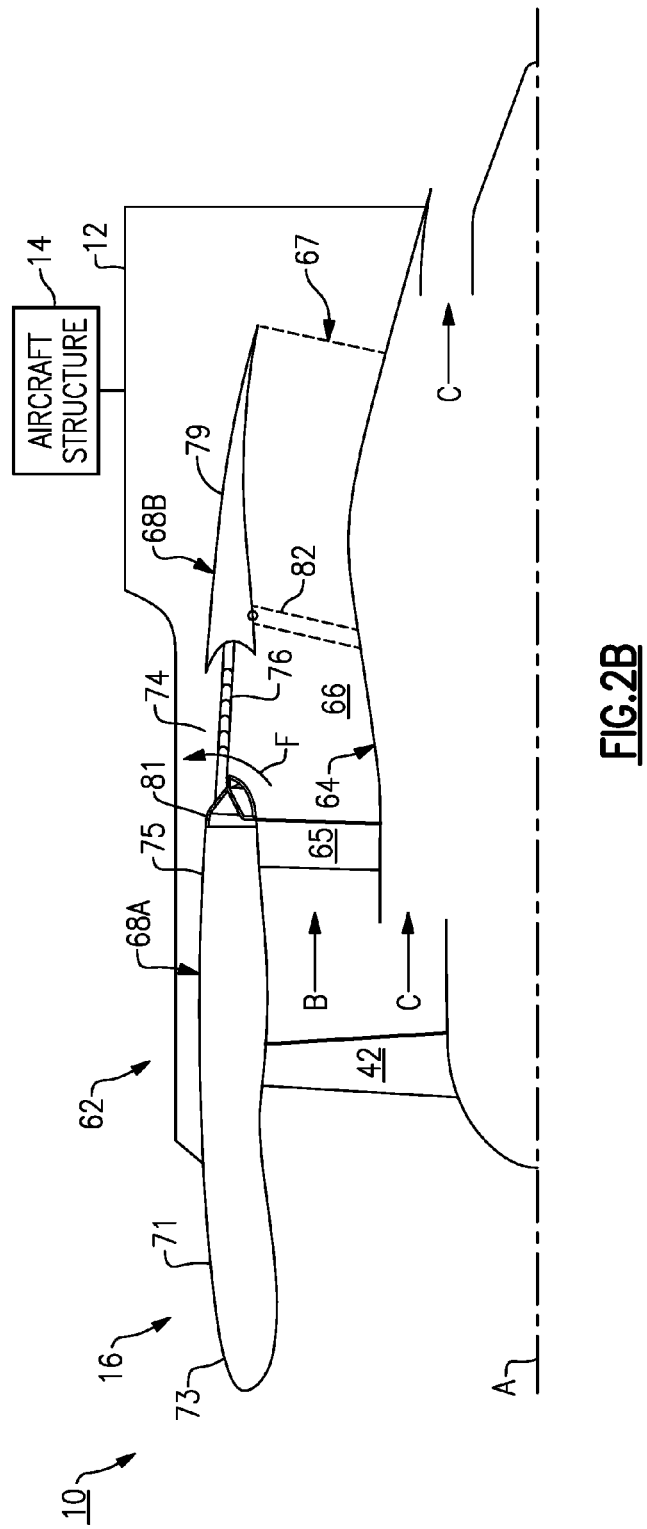
FIG. 2B schematically shows the thrust reverser of FIG. 2A in an open position.

An integrated propulsion system 10 generally includes an engine 20 (FIG. 1), a pylon 12 mounted to an aircraft structure 14 such as an aircraft wing or fuselage (FIGS. 2A and 2B), and a nacelle assembly 16 (FIGS. 2A and 2B). The various components of the integrated propulsion system 10 are designed and implemented in an integrated or holistic manner to achieve a new state. The term "integrated propulsion system" is utilized for the purposes of this disclosure to mean multiple propulsion components, such as a nacelle and a gas turbine engine, and in some instances, also an engine pylon and an aircraft static structure, designed or configured in an interactive process according to commonly defined and interrelated sets of requirements, such that the overall performance of the system is optimized. An explanation of this interactive process, with examples, is provided below, with later reference to FIGS. 3A and 3B. This technique desirably leads to higher overall system performance in terms of size, weight and efficiency.

FIG. 1 schematically illustrates a gas turbine engine 20 of the kind which could be part of the integrated propulsion system 10. FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle assembly 16 (shown in FIGS. 2A and 2B) with portions of the nacelle assembly 16 surrounding a fan case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7° R)]^{0.5}$. The "Low corrected fan tip speed" as disclosed herein according to one non-limiting embodiment is less than about 1150 ft/second.

FIGS. 2A and 2B illustrate a highly schematic view of a nacelle assembly 16 for the engine 20 of FIG. 1. The nacelle assembly 16 includes a fan nacelle 62 and a core cowling 64 arranged coaxially about the engine axis A. The fan nacelle 62 and the core cowling 64 define outer flow surfaces of the nacelle assembly 16 and also surround the engine 20.

The fan nacelle 62 includes a first nacelle section $68_A$ which surrounds the fan case 15 and a second nacelle section $68_B$ axially aft of the first fan nacelle section 68A relative to the engine axis A attached to the aft end of the fan case 15 and surrounding the core engine 20. The fan nacelle 62 at least partially surrounds the core engine 20 to define a generally annular bypass duct 66 configured to communicate bypass airflow B from the fan 42. The first nacelle section $68_A$ has a forward portion 73 defining an inlet lip 71 positioned axially forward of the fan 42 and a fan cowl door or an aft portion 75 positioned axially aft of the fan 42. The inlet lip 71 is configured to direct a portion of the incoming airflow along the radially outer surfaces or wall 85 of the fan nacelle 62 and another portion of incoming airflow along radially inner surfaces or wall 87 of the first nacelle section $68_A$ towards the fan 42.

In the illustrative example, the second nacelle section $68_B$ includes a forward portion 81 fixedly attached to the fan case 15 and a translatable portion 79 moveable relative to the forward portion 81 and the core cowling 64 to define a secondary flow passage 74. The core cowling 64 is attached to the forward portion 81 of the second nacelle section $68_B$ and is arranged downstream of the fan 42 to guide the fan airflow B after exiting one or more circumferentially spaced structures or FEGVs 65. The bypass airflow B communicates through the bypass duct 66 and is discharged through a nozzle exit area 67.

The nacelle assembly 16 includes a thrust reverser 72 configured to selectively communicate a portion of bypass airflow between the bypass flow path B and a secondary flow passage 74 (FIG. 2B). The thrust reverser 72 includes one or more cascades 76 arranged between the first and second nacelle sections $68_A$, $68_B$. The cascade 76 can include one or more sections arranged about the engine axis A to define a generally annular array. The cascade 76 can include one or more vanes 77 configured to direct airflow F through the secondary flow passage 74 and generate reverse thrust, such as during ground operations of the aircraft. The second nacelle section $68_B$ is translated axially from the first nacelle section $68_A$ to uncover or deploy the cascade 76 (FIG. 2B). In the illustrative example, the second nacelle section $68_B$ includes a forward portion 81 fixedly attached to the fan case 15 and a translatable portion 79 moveable relative to the forward portion 81 and the core cowling 64 to define a secondary flow passage 74.

While stowed (FIG. 2A), the cascade 76 is received at least partially within a cavity 78 defined between inner and outer walls of the second nacelle section $68_B$. In the illustrative example, the cascade 76 is mounted to the forward portion 81 of the second nacelle section $68_B$ such that the translatable portion 79 of the second nacelle section $68_B$ translates relative to the cascade 76. In an alternative example, the cascade 76 is mounted to the translatable portion 79 of the second nacelle section $68_B$ such that the cascade 76 translates relative to the forward portion 81 of the second nacelle section $68_B$ and is stowed at least partially between the outer walls of the first nacelle section $68_A$ and the fan case 15.

Figure 4A:
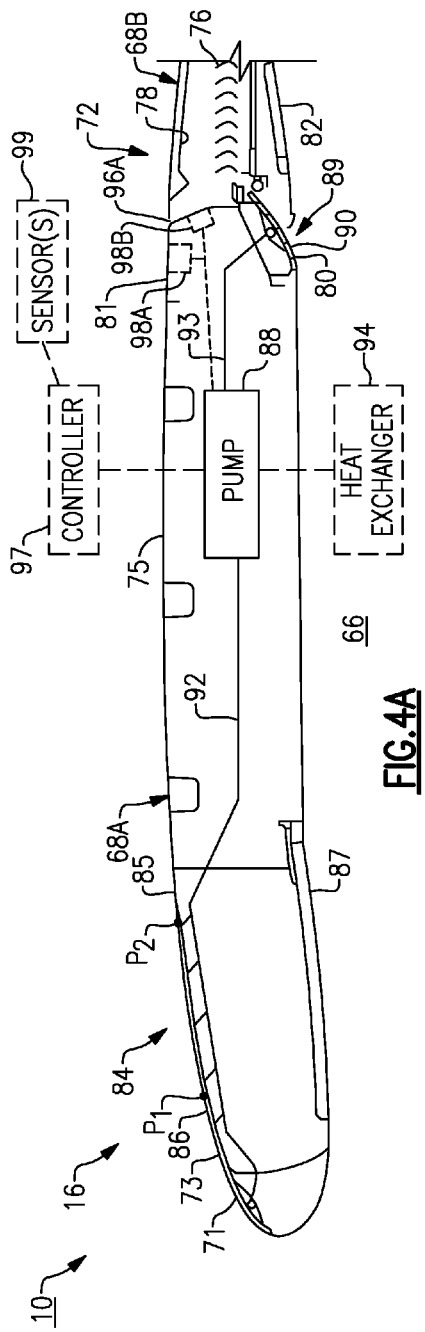
FIG. 4A is a schematic view of selected portions of a propulsive system with a thrust reverser in a closed position.

The forward portion 81 of the second nacelle section $68_B$ defines a region having an air ramp or bull-nose 80. The bull-nose 80 has a generally annular geometry about the engine axis A. In some examples, the bull-nose 80 has an arcuate profile configured to direct bypass airflow from the bypass duct 66 radially outward towards the cascade 76. The bull-nose 80 defines a portion of the secondary flow passage 74 when the thrust reverser 72 is deployed (FIGS. 2B and 4B) and bounds the cavity 78 when the thrust reverser 72 is non-operational or stowed (FIGS. 2A and 4A).

In some examples, the thrust reverser 72 includes one or more blocker doors 82 (shown schematically as dashed lines in FIG. 2B) pivotably mounted to the second nacelle section $68_B$. The blocker doors 82 are attached to a translatable portion 79 of the second nacelle section $68_B$ and can be attached to the core cowling 64 by one or more linkages. The blocker doors 82 are pivotable between a stowed position and a deployed position (FIG. 2B) to direct the bypass flow B towards the cascade 76 in the secondary flow passage 74. Translation of the second fan nacelle section $68_B$ drives the blocker doors 82 from the stowed position to the deployed position. In alternative examples, surface contouring of the second nacelle section $68_B$ and/or the core cowling 64 along the bypass duct 66 provides similar functionality as the blocker doors 82 to modulate the bypass flow B.

In alternative examples, the thrust reverser 72 is a pivot door thrust reverser configuration in which the cascade 76 is omitted. In this arrangement, portions of the second nacelle section $68_B$ are configured to pivot or drop down into the bypass flow path B to direct airflow through the secondary flow passage 74. Other portions of the second nacelle section $68_B$ can be configured to pivot radially outward to direct flow from the secondary flow passage 74 forward to provide reverse thrust.

Figure 2C:
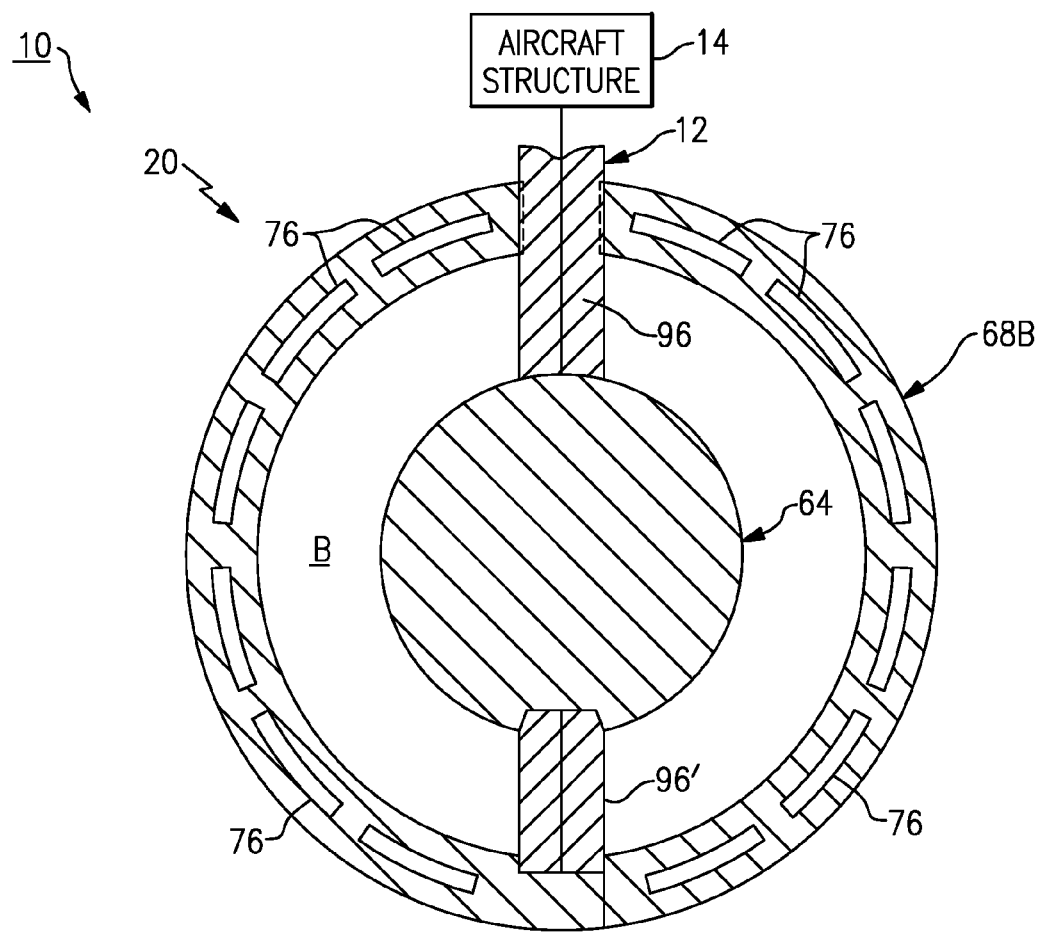
FIG. 2C is a cross-sectional view of the nacelle assembly of FIGS. 2A and 2B through line A-A of FIG. 2A.

Referring to FIG. 2C, the nacelle assembly 16 includes one or more bifurcations 96. The bifurcations 96 extend radially between the core cowling 64 and the second nacelle section 68$_B$. In one example, the bifurcation 96 is a single bifurcation to define a C-Duct arrangement. In the illustrative example, bifurcations 96, 96' are positioned radially outboard from the engine axis A, and may be referred to as an upper bifurcation and lower bifurcation. The bifurcations 96 are not limited to any particular spatial orientations, and in particular the lower bifurcation may alternatively be omitted from the bypass flow path B to form an O-Duct configuration, for example. The bifurcations 96 extend radially between the core cowling 64 and the second nacelle sections 68$_B$ through the bypass flowpath B, thereby bifurcating the bypass flowpath B.

Figure 3A:
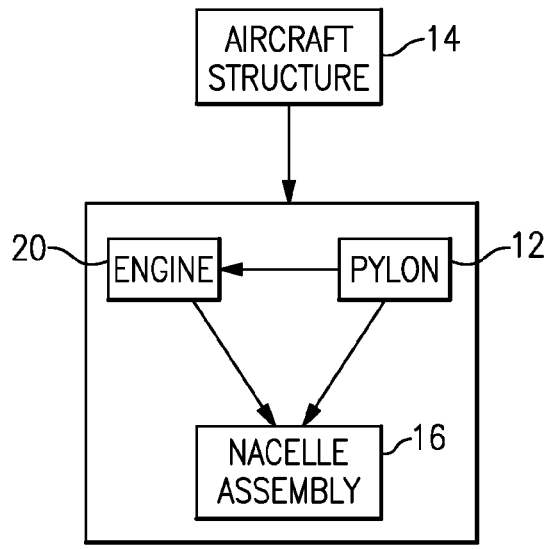
FIG. 3A illustrates a prior process for designing a propulsive system.

FIG. 3A illustrates designing a propulsive system in a prior process. As shown in FIG. 3A, prior propulsive systems are designed in a hierarchical manner, in which the design requirements of an aircraft structure 14 drive the requirements of an engine 20, pylon 12 and nacelle assembly 16. The design requirements of the engine 20 depend on the design requirements of the pylon 12, and the design requirements of the nacelle assembly 16 depend on the design requirements of both the pylon 12 and the engine 20. In this manner, the engine 20, nacelle assembly 16, pylon 12 and aircraft structure 14 are independently designed and not necessarily designed to optimize the overall performance of the propulsion system.

Figure 3B:
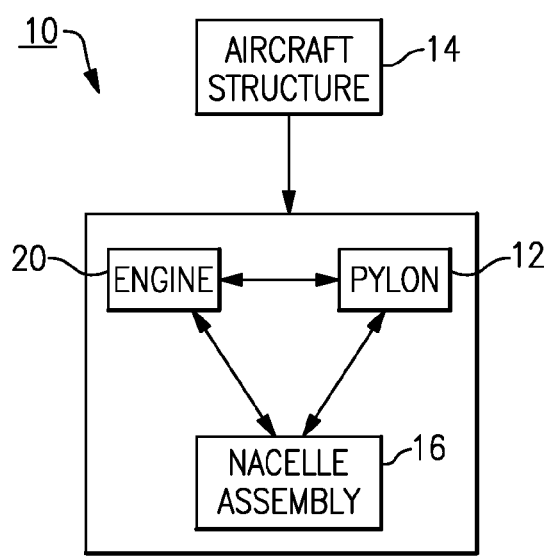
FIG. 3B illustrates an interactive process for designing a propulsive system.

FIG. 3B illustrates a process for designing the integrated propulsive system 10 in an interactive process. As shown, the design requirements of the engine 20, nacelle assembly 16, pylon 12 and aircraft structure 14 are selected in an interactive and interdependent manner to improve the overall performance of the propulsion system 10, utilizing any of the techniques discussed herein. For example, the interactive process includes identifying two or more of aerodynamic, propulsive or cooling requirements for the system, and interdependently designing the components such as the nacelle assembly 16 and engine 20 to meet the requirements. Other design and operating requirements can be utilized in the interactive process, such as fuel consumption, or aircraft type such as short-range, mid-range or long-range models.

Figure 4B:
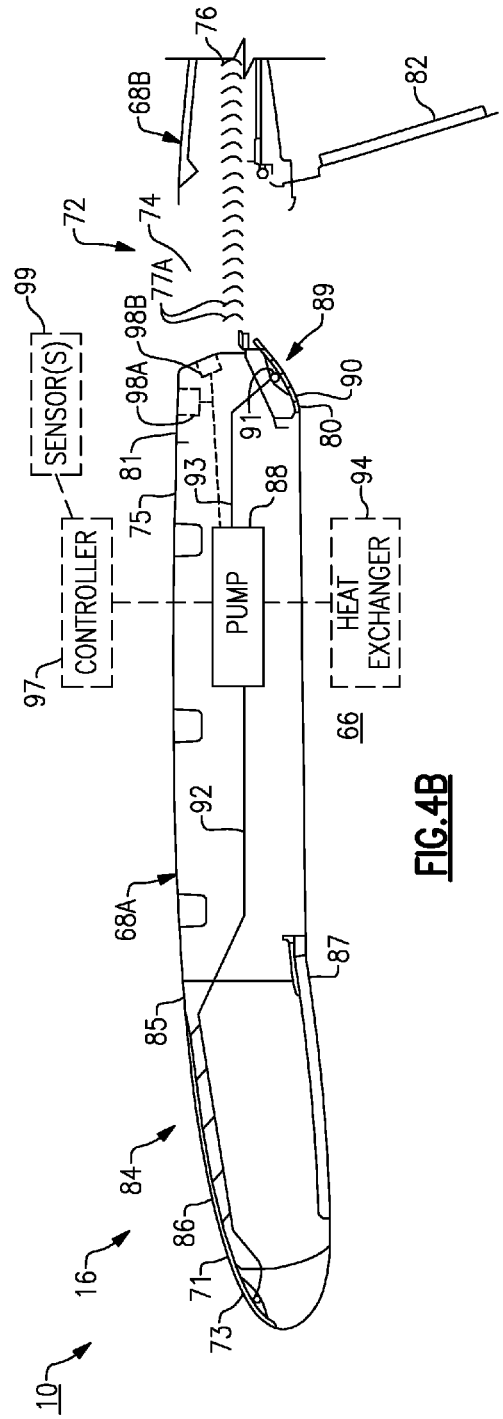
FIG. 4B is a schematic view of the propulsive system of FIG. 4A with the thrust reverser in an open position.

FIGS. 4A and 4B illustrate designing the propulsion system 10 in the interactive process of FIG. 3B. For example, the design of the nacelle assembly 16 can be based upon the aerodynamic lines of the nacelle assembly 16 and the performance characteristics of the thrust reverser 72. In the illustrative example, design of the nacelle assembly 16 includes designing the inlet lip 71 of the nacelle assembly 16 with an active boundary layer control assembly to affect laminar flow along the nacelle assembly 16, designing the thrust reverser 72 with active flow control for improved reverse thrust performance, coupling the boundary layer control assemblies of the inlet lip 71 and the thrust reverser 72, and selecting discharge points for airflow from the flow control assemblies based on cooling or aerodynamic requirements of the various components of the integrated propulsion system 10, such as select locations the nacelle assembly 16 and the engine 20, as will be discussed in detail below. For the purposes of this disclosure, a "boundary layer" refers to an area of flow surface where the velocity gradient is zero. Rather, the velocity profile of incoming airflow goes from a freestream away from the boundary layer to near zero at the boundary layer.

The inlet lip 71 includes an inlet laminar flow control assembly 84 configured to affect the boundary layer conditions along the radially outer wall 85 of the first nacelle section 68$_A$. In the illustrative example, the inlet laminar flow control assembly 84 includes a perforated skin 86 coupled to a bi-directional flow device or pump 88 via one or more conduits 92. The pump 88 can be driven by an electrical motor or pneumatically, for example. The perforated skin 86 can include one or more openings formed in the radially outer wall 85 utilizing laser drilling or another technique. The openings can have various geometries depending on the needs of a particular situation.

The pump 88 is configured to selectively draw airflow from the perforated skin 86 of the inlet lip 71 to affect the boundary layer conditions, thereby causing a transition between laminar flow conditions and turbulent flow conditions to occur axially aft of point P1 (non-operational) at point P2 (operational). Operation of the inlet laminar flow control assembly 84 simulates a "thin" inlet lip such that an effective thickness of the fan nacelle 62 in the radial direction is reduced, thereby reducing aerodynamic losses and drag along the radially outer wall 85 caused by interaction of the radially outer wall 85 and incoming airflow. Simulating a thin inlet lip may be desirable during certain operating conditions of the aircraft, such as during cruise conditions, whereas a relatively "thick" inlet, in which the effective thickness of the fan nacelle 62 is relatively greater, may be desirable during other operating conditions, such as cross-wind conditions, take-off, and the like.

Although the illustrative example shows the inlet laminar flow control assembly 84 located adjacent to the outer wall 85 of the first nacelle section 68$_A$, the inlet laminar flow control assembly 84 can be located adjacent to other surfaces of the nacelle assembly 16 such as the radially inner wall 87 of first nacelle section 68$_A$ defining the bypass duct 66.

The thrust reverser 72 includes an efflux flow control assembly 89 configured to affect flow separation conditions along surfaces of the secondary flow passage 74. In the illustrative example, the efflux flow control assembly 89 includes a perforated skin 90 along a portion of the bull-nose 80 defining the secondary flow passage 74. The perforated skin 90 can include one or more openings formed in the outer wall of the bull-nose 80 utilizing any of the techniques and having any of the various geometries described herein. The perforated skin 90 can be coupled to a plenum 91 defined by the bull-nose 80.

Utilizing the interactive design process, the perforated skin 90 or plenum 91 is coupled to the pump 88 via one or more conduits 93. Rather, the pump 88 can be utilized to provide boundary layer control for the inlet laminar flow control assembly 84 and flow separation control for the efflux flow control assembly 89. The pump 88 is configured to selectively draw airflow from the perforated skin 90 of the bull-nose 80 to affect the air flow conditions, thereby preventing or at least reducing flow separation around the bull-nose 80. Utilizing this technique, a relatively greater amount of bypass airflow B is directed towards the first set of vanes 77$_A$ of the cascade 76 to affect the efflux characteristics of the thrust reverser 72 and generate additional reverse thrust. Accordingly, an axial length of the cascade 76 relative to the engine axis A can be reduced, which reduces an overall length of the nacelle assembly 16. The cascade 76 also fits within the nacelle aerodynamic lines to provide a shorter and smaller system.

The inlet laminar flow control assembly 84 or efflux flow control assembly 89 can also be configured to discharge airflow at adjacent surface locations during various operational conditions, in addition to, or alternatively from drawing airflow from the adjacent surface locations to affect boundary layer conditions or flow separation, depending on the needs of a particular situation. During cruise conditions, the inlet laminar flow control air can be used for cooling the engine 20 or airframe environmental control system (ECS) or other components, for flow control on external airflow surfaces to reduce drag, for flow control in the bypass duct to reduce losses caused by drag, or for thrust recovery in the core compartment defined between the engine case and the nacelle inner wall, for example.

Utilizing the interactive design process, the pump 88 is configured to discharge airflow drawn from the inlet laminar flow control assembly 84 and the efflux flow control assembly 89 at selected locations to improve overall performance of the integrated propulsion system 10. In one example, the pump 88 is configured to communicate airflow from the inlet laminar flow control assembly 84 or efflux flow control assembly 89 to a heat exchanger 94 to reduce the cooling demands on the engine 20. In one example, the heat exchanger 94 is a pre-cooler configured to provide relatively cool airflow to one or more systems, such an environmental control system (ECS) or another aircraft system.

In another example, the pump 88 is configured to selectively communicate airflow between the inlet lip 71 and the secondary flow passage 74. Bypass airflow drawn from the efflux flow control assembly 89 is selectively discharged at the perforated skin 86 of the inlet laminar flow control assembly 84, thereby removing debris that may collect within the openings of the perforated skin 86 and increasing drag to stop or otherwise reduce the aircraft velocity during landing.

In other examples, the pump 88 is configured to selectively discharge airflow from the laminar flow control assembly 84 to a downstream location to improve the aerodynamic performance of the nacelle assembly 16. In one example, the pump 88 is configured to discharge airflow at an outlet $98_A$ adjacent a seam $96_A$ (FIG. 4A) defined by the first nacelle section $68_A$ and the second nacelle section $68_B$ when the second nacelle section $68_B$ is translated to a stowed position, thereby reducing flow separation at the seam $96_A$. In another example, the pump 88 is configured to discharge airflow at an outlet $98_B$ adjacent a wall of the cavity 78. The airflow can thereafter by discharged at various locations of the second nacelle section $68_B$, such as surfaces of a trailing edge region $96_B$ (FIG. 2A) to reduce flow separation.

The pump 88 can be modulated by a controller 97. The controller 97 is configured to cause the pump 88 to operate in at least a first mode and a second mode in response to determining one or more operational conditions of the nacelle assembly 16 or aircraft. The controller 97 is configured to cause the pump 88 to operate in at least a first flow direction when in the first mode and a second flow direction when in the second mode. Airflow can be communicated from the forward portion 81 to the inlet lip 71 in the first mode, and from the inlet lip 71 to a location downstream of the inlet lip 71 in the second mode, for example. In further examples, airflow is communicated between the pump 88 and surfaces of the secondary flow passage 74 in the first mode, but not in the second mode. The controller 97 can be coupled to one or more sensors 99 located at various locations of the integrated propulsion system 10 configured to measure the operational condition(s).

The controller 97 can include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the various functionality disclosed herein. In some examples, the controller 97 interfaces with, or is integrated with, various control systems including an engine controller or an aircraft flight control system to provide the desired solution.

Figure 5:
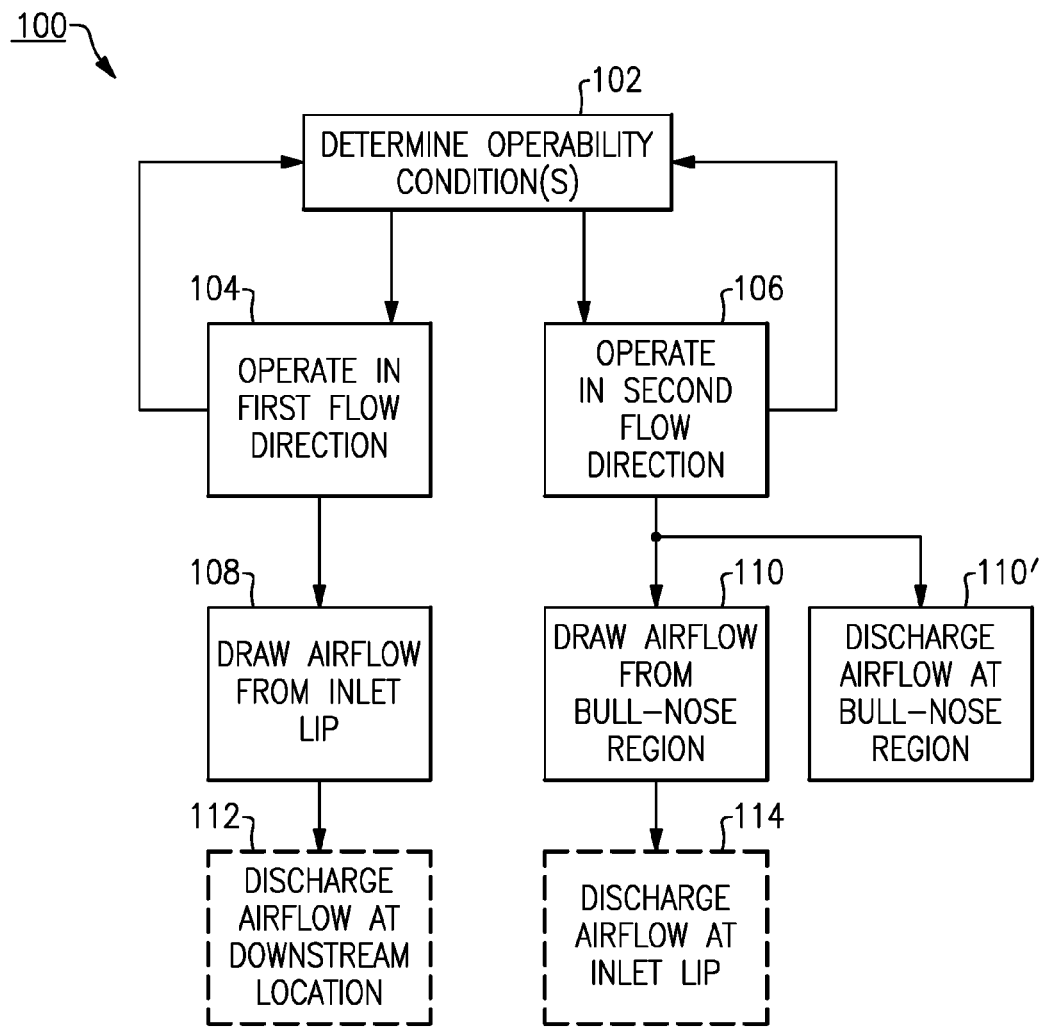
FIG. 5 illustrates a combined process for controlling boundary layer conditions of a propulsion system.

FIG. 5 illustrates a combined process 100 in a flowchart for controlling boundary layer and flow separation conditions at multiple locations of an integrated propulsion system, utilizing any of the techniques discussed herein and the integrated propulsion system 10. The controller 97 can be programmed with the functionality of the process 100 to provide the desired solution.

One or more operability conditions of the aircraft are determined at a first step indicated at 102. A subsequent step of the process 100 indicated at 104 causes a pump to operate in a first flow direction in response to detecting a first operating condition such as cruise conditions, and at step 106 the process 100 causes the pump to operate in a second flow direction in response to detecting a second, different operating condition such as reverse thrust conditions. At step 108 the pump draws airflow from surfaces of a forward portion of the nacelle assembly such as an inlet lip, thereby controlling or otherwise affecting the laminar flow characteristics and boundary layer conditions adjacent the inlet lip. At step 110 the pump draws airflow from surfaces of a forward portion of a second nacelle section such as a bull-nose region. At step 112 airflow from the inlet lip can be discharged at a downstream location such as a seam between two nacelle sections of the nacelle assembly, or can be communicated to another subsystem for cooling augmentation or reducing aerodynamic losses. At step 114 airflow from the forward portion or bull-nose region is discharged at the inlet lip. In alternative examples, at step 110' airflow is discharged or blown at the bull-nose region to increase flow attachment. The airflow can be drawn from various sources, such as the bypass flow path B or at locations 98A, 98B (FIG. 4A-4B), for example.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A nacelle assembly for a gas turbine engine, comprising:
   a fan nacelle bounding a bypass flow path, the fan nacelle including a first nacelle section and a second nacelle section, the second nacelle section including a moveable portion movable relative to a forward portion to define a secondary flow passage, the first nacelle section including an inlet lip;
   a thrust reverser configured to selectively communicate a portion of bypass airflow between the bypass flow path and the secondary flow passage; and a pump configured to selectively communicate airflow between the inlet lip and the secondary flow passage, wherein the pump is configured to draw airflow from surfaces of the inlet lip, and the pump is configured to communicate airflow from the inlet lip to the second nacelle section, and wherein the pump is a bi-directional pump.

2. The nacelle assembly as recited in claim 1, wherein the thrust reverser includes a cascade configured to direct bypass airflow through the secondary flow passage.

3. The nacelle assembly as recited in claim 2, wherein the forward portion defines a bull-nose having an arcuate profile configured to direct bypass airflow towards the cascade, and the bull-nose includes a perforated surface coupled to the pump.

4. The nacelle assembly as recited in claim 3, wherein airflow from the inlet lip is configured to discharge over surfaces of the bull-nose to increase flow attachment.

5. The nacelle assembly as recited in claim 1, wherein the inlet lip includes a perforated surface coupled to the pump.

6. The nacelle assembly as recited in claim 5, wherein the perforated surface defines a radially outer wall of the inlet lip.

7. The nacelle assembly as recited in claim 1, wherein the pump is configured to selectively communicate airflow in at least a first flow direction and in a second flow direction in response to one or more operability conditions of the nacelle assembly.

8. The nacelle assembly as recited in claim 1, wherein airflow from the inlet lip is configured to discharge at a trailing edge region of the second nacelle section.

9. The nacelle assembly as recited in claim 1, comprising:
a controller configured to cause the pump to operate in at least a first mode and a second mode in response to determining one or more operability conditions of the nacelle assembly; and
wherein airflow is communicated from the forward portion to the inlet lip in the first mode, and airflow is communicated from the inlet lip to a location downstream of the inlet lip in the second mode.

10. A gas turbine engine, comprising:
a core cowling arranged at least partially about a compressor section, a combustor section and a turbine section;
a fan nacelle arranged at least partially about the core cowling to define a bypass flow path, the fan nacelle including a first nacelle section having an inlet lip and a second nacelle section, the second nacelle section including moveable portion movable relative to a forward portion to define a secondary flow passage;
a thrust reverser positioned axially between the first nacelle section and the second nacelle section, the thrust reverser including a cascade configured to direct bypass airflow through the secondary flow passage; and
a bi-directional pump configured to selectively communicate airflow between surfaces of the inlet lip and surfaces of the secondary flow passage.

11. The gas turbine engine as recited in claim 10, wherein the bi-directional pump is configured to selectively communicate airflow in at least a first flow direction and in a second flow direction in response to one or more operability conditions of the engine.

12. The gas turbine engine as recited in claim 11, wherein: airflow is discharged at radially outer surfaces of the inlet lip in response to the bi-directional pump communicating airflow in the first flow direction; and airflow is drawn from surfaces of the inlet lip in response to the bi-directional pump communicating airflow in the second flow direction.

13. The gas turbine engine as recited in claim 11, wherein the second nacelle section defines a cavity, and the bi-directional pump is configured to selectively discharge airflow to the cavity when the second nacelle section is located in a stowed position.

14. The gas turbine engine as recited in claim 13, wherein the cavity is defined between inner and outer walls of the second nacelle section, and the cascade is at least partially received within the cavity.

15. The gas turbine engine as recited in claim 10, wherein the bi-directional pump is configured to communicate airflow from at least one of the inlet lip and the secondary flow passage to a heat exchanger.

16. The gas turbine engine as recited in claim 10, comprising:
a controller configured to cause the bi-directional pump to operate in at least a first mode and a second mode in response to determining one or more operability conditions of the engine;
wherein airflow is communicated in a first flow direction between the bi-directional pump and surfaces of the inlet lip in the first mode, and is communicated in a second, different flow direction between the bi-directional pump and surfaces of the inlet lip in the second mode; and
wherein airflow is communicated between the bi-directional pump and surfaces of the secondary flow passage in the first mode, but not in the second mode.

17. A method of flow distribution for a gas turbine engine, comprising:
providing a first nacelle having an inlet lip;
providing a second nacelle including a forward portion and a moveable portion selectively defining a secondary flow passage;
causing a flow device to draw airflow from surfaces of the inlet lip in response to detecting a first operating condition, the flow device being a bi-directional pump; and
causing the flow device to discharge airflow from the secondary flow passage to the surfaces of the inlet lip in response to detecting a second, different operating condition.

18. The method as recited in claim 17, comprising:
operating the flow device in a first flow direction in response to detecting the first operating condition;
operating the flow device in a second flow direction in response to detecting the second operating condition; and
wherein the flow device is coupled to the inlet lip and the forward portion of the second nacelle.

19. The method as recited in claim 17, wherein:
the second nacelle defines a cavity; and
airflow is selectively communicated from surfaces of the inlet lip to the cavity.

20. The method as recited in claim 19, wherein the step of discharging airflow from the secondary flow passage to the surfaces of the inlet lip is in response to moving the moveable portion relative to the forward portion.

21. The method as recited in claim 19, comprising directing flow through a cascade situated in the secondary flow passage, wherein the cascade is at least partially received within the cavity, and the cavity is defined between inner and outer walls of the second nacelle.

* * * * *